United States Patent
Smith

(10) Patent No.: US 8,941,936 B1
(45) Date of Patent: Jan. 27, 2015

(54) HYBRID SURFACE FORMAT HARD DISK DRIVE

(71) Applicant: International Business Machines Corporation, Armonk, NY (US)

(72) Inventor: Daniel F. Smith, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/317,266

(22) Filed: Jun. 27, 2014

(51) Int. Cl.
*G11B 5/012* (2006.01)

(52) U.S. Cl.
USPC .......................................................... 360/31

(58) Field of Classification Search
USPC .......... 360/31, 48, 55, 40, 58, 135, 43, 77.04, 360/50
See application file for complete search history.

(56) References Cited

U.S. PATENT DOCUMENTS

| | | |
|---|---|---|
| 2005/0069298 A1 | 3/2005 | Kasiraj et al. |
| 2010/0232057 A1 | 9/2010 | Sanvido et al. |
| 2011/0075292 A1* | 3/2011 | New et al. ................. 360/77.04 |
| 2012/0300326 A1 | 11/2012 | Hall |
| 2012/0300328 A1 | 11/2012 | Coker et al. |
| 2013/0037317 A1 | 2/2013 | Iwata et al. |
| 2013/0232292 A1 | 9/2013 | Brandic et al. |
| 2013/0246703 A1 | 9/2013 | Brandic et al. |

\* cited by examiner

*Primary Examiner* — Nabil Hindi
(74) *Attorney, Agent, or Firm* — Lieberman & Brandsdorfer, LLC

(57) ABSTRACT

Embodiments of the invention relate to a hard disk drive (HDD) formatted with at least two surfaces, each of the surfaces serviced a write head, each write head configured for the respective surface. At least one of the surfaces of the HDD is serviced by a random block overwrite (RBO) head for an associated surface. Similarly, at least one of the surfaces of the HDD is serviced by a shingled magnetic recording (SMR) head for an associated SMR surface. The properties of both the RBO and SMR surfaces are retained, and at the same time leveraged to maximize data density and write performance in a single HDD.

20 Claims, 7 Drawing Sheets

HYBRID SURFACE FORMAT HARD DISK DRIVE

BACKGROUND

The invention relates to a magnetic recording hard disk drive (HDD). More specifically, the invention relates to a hybrid surface format HDD including a shingled magnetic recording (SMR) surface and a random block overwrite (RBO) surface.

An HDD formatted principally for SMR employs an SMR formatted write head that writes magnetic transitions by making a plurality of consecutive circular paths that partially overlap. A region of adjacent tracks is written so as to overlap one or more previously written tracks. The shingled tracks must be written in sequence. Non-overlapped portions of adjacent paths form the shingled data tracks, which are narrower than the width of the write head. The narrower shingled data tracks allow for increased data density. Once written in shingled structure, an individual track cannot be updated in place because that would overwrite and destroy data in the overlapping tracks. In contrast, a disk drive formatted for RBO allows random block overwrite without disturbing existing data.

Shingle written data tracks provide a high track density. However, shingled written data tracks do not allow random block overwrite. In order to overwrite a data block in the shingled data track, a significant portion of the disk must be erased while writing is taking place.

SUMMARY

The invention includes a method, computer program product, and system for utilizing a hybrid HDD formatted with both RBO and SMR formatted write heads.

A method, computer program product, and system are provided for configuring the hybrid HDD with different write heads, each of the write heads formatting data with respect to the multiple surfaces formats of the hybrid HDD. The HDD is provided with at least one RBO formatted write head to write data to an RBO formatted surface of the HDD and at least one SMR formatted write head to write data to an SMR formatted surface of the HDD. Random write performance is leveraged with the RBO formatted surface and storage density is leveraged with the SMR formatted surface, both present in a single HDD.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
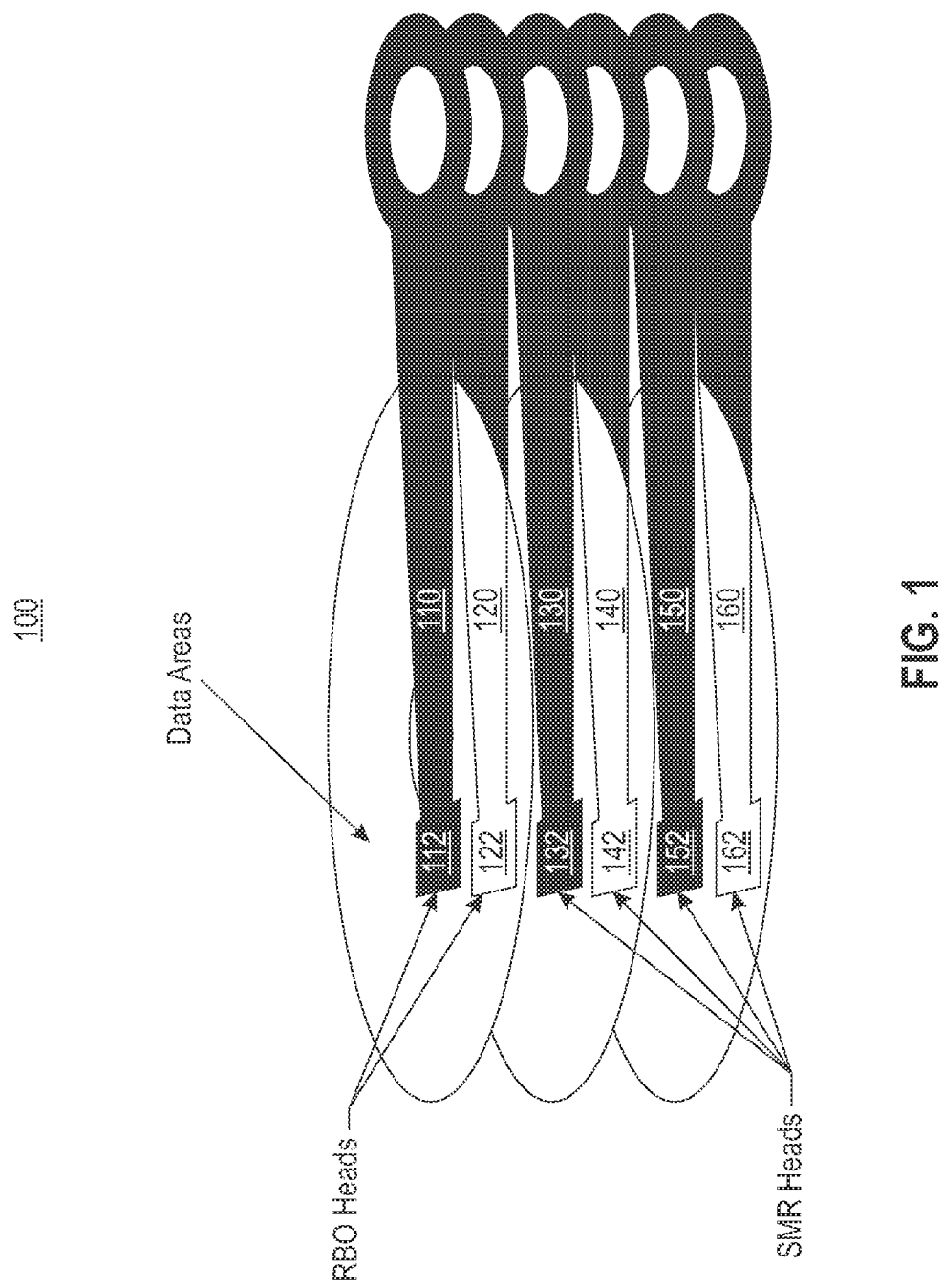
FIG. 1 depicts a block diagram illustrating a hard disk drive with multiple data surfaces.

With reference to FIG. 1, a block diagram (100) is provided illustrating an HDD with multiple data surfaces. Six data surfaces are shown herein (110), (120), (130), (140), (150), and (160). Each of the surfaces has an associated write head. Namely, surface (110) has write head (112), surface (120) has write head (122), surface (130) has write head (132), surface (140) has write head (142), surface (150) has write head (152), and surface (160) has write head (162). In the example shown herein, two of the write heads are formatted as RBO heads and four of the write heads are formatted as SMR heads. In one embodiment, the RBO surfaces are limited to an integer number of heads. As shown in this example, the RBO heads are identified as (112) and (122), and the SMR heads are identified as (132), (142), (152), and (162). RBO heads (112) and (122) service RBO surfaces (110) and (120), respectively, and SMR heads (132), (142), (152), and (162) service SMR surfaces (130), (140), (150), and (160), respectively.

Figure 2:
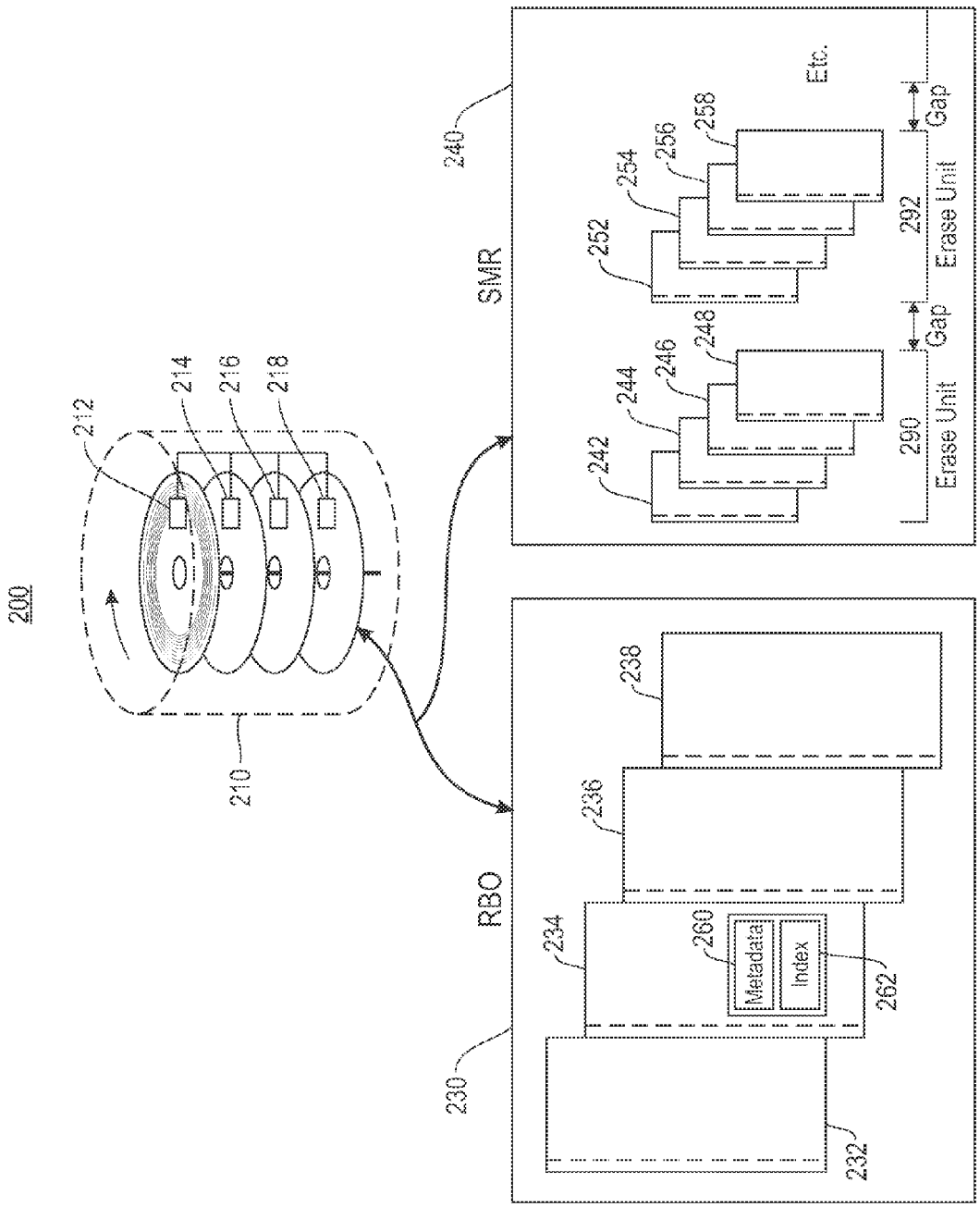
FIG. 2 depicts a block diagram illustrating a hybrid hard disk drive (HDD).

As shown in FIG. 1, a hybrid HDD is provided with at least one RBO head writing data to an RBO formatted surface, hereinafter referred to as an RBO surface and at least one SMR head writing data to an SMR formatted surface, hereinafter referred to as an SMR surface. Referring to FIG. 2, a block diagram (200) is provided showing a HDD. As shown, the HDD (210) is configured with a plurality of read/write heads (212), (214), (216), and (218). At least one of the read/write heads writes data to the RBO formatted surface (230), and at least one of the read/write heads writes data to the SMR format surface (240). Specifically, the HDD includes at least one RBO formatted surface (230) and at least one SMR formatted surface (240). The RBO formatted surface (230) is a conventional surface with non-overlapping data tracks (232), (234), (236), and (238). Conversely, the SMR formatted surface (240) includes a plurality of overlapping tracks. The SMR formatted tracks at least partially overlap to increase areal density.

As noted above, data stored in the SMR data tracks is organized in units referred to as erase units. Each erase unit is shown with multiple tracks, although the quantity shown herein should not be considered limiting. For example, erase unit (290) is shown with tracks (242), (244), (246), and (248), and erase unit (292) is shown with tracks (252), (254), (256), and (258). Data pertaining to the SMR erase units is stored in the RBO surface (230). In one embodiment, SMR metadata (260) pertaining to locations of SMR erase units is provided in one or more of the RBO formatted surfaces. For example, in one embodiment, the metadata (260) includes an index (262) located in one of the non-overlapping tracks (232)-(238). The index includes information on a location of one or more SMR erase units, including at least one partially free erase unit. In one embodiment, the metadata (260) includes layout and ordering of two or more SMR erase units. In one embodiment, erase units may be rebuilt to different parts of the SMR surface (240). Therefore, the index (262) is provided in the RBO surface (230) so that the information on the erase units is updatable and every piece of data is accessible. Accordingly, data in the SMR surface (240) is organized into erase units, metadata, and an index to these units is stored in the RBO formatted surface (230).

As shown herein, the SMR formatted surface (240) and the RBO formatted surface (230) are shown with multiple data tracks. Although only four RBO data tracks and eight SMR data tracks in two erase units (290) and (292) are shown, this quantity should not be considered limiting. In one embodiment, a greater quantity of tracks may be provided and/or the number of SMR and RBO data tracks may be equivalent. Accordingly, the HDD includes separate data tracks for both RBO and SMR formatted data in a single storage device, with at least one RBO formatted head to write data to an RBO formatted track, and at least one SMR formatted head to write data to an SMR formatted track.

Figure 3:
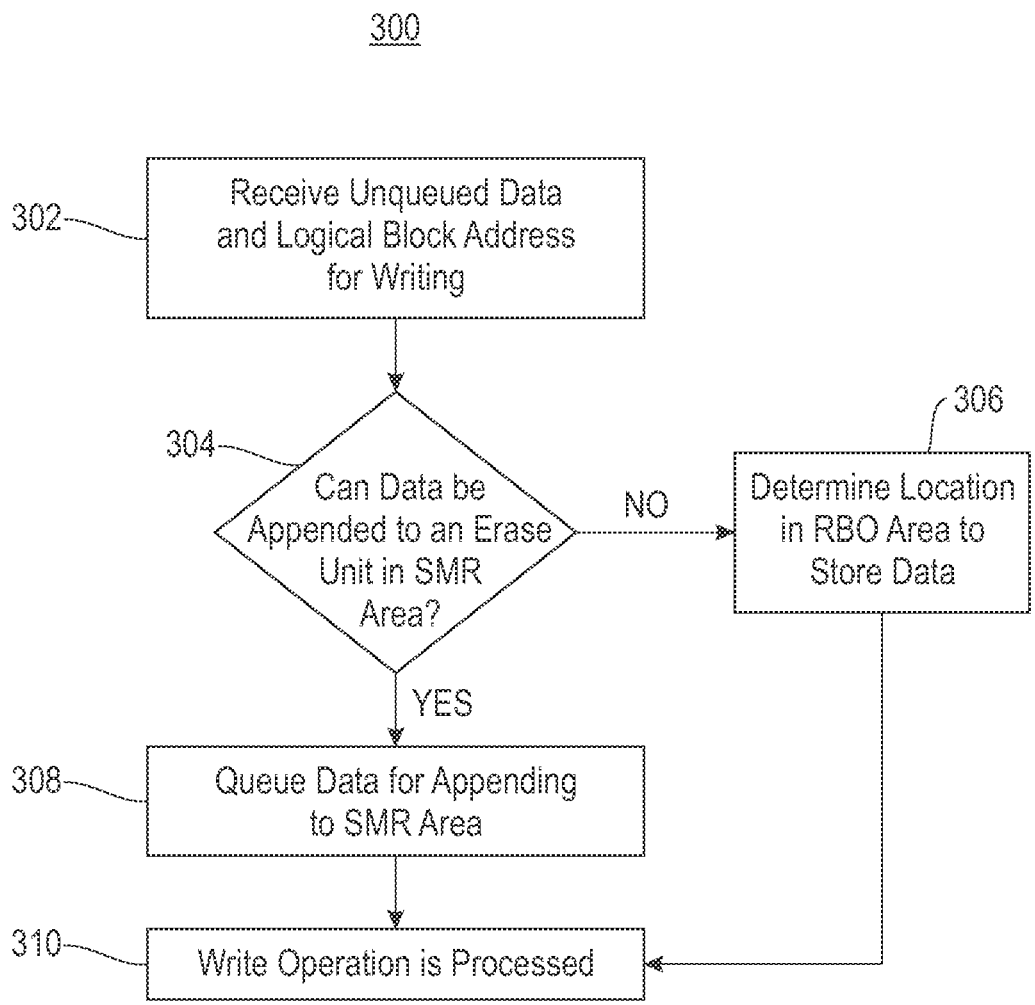
FIG. 3 depicts a flow chart illustrating functionality of the hybrid HDD, and specifically a general write operation for the hybrid HDD.

In one aspect, the SMR and RBO areas of the hybrid hard disk drive function in a tiered relationship. Referring to FIG. 3, a flow chart (300) is provided illustrating the functionality of the hybrid HDD that includes at least one RBO write head and at least one SMR write head, and specifically a general write operation for the hybrid HDD. Data for writing that is not in a queue, and an associated logical block address, are received (302). The ultimate surface destination for the write data is the SMR surface of the HDD as this area has the greatest storage density. Following the receipt of data at step (302), it is determined if the received data can be appended to an erase unit in the SMR surface area (304). In one embodiment, there is one erase unit associated with a logical block address, and the write data can either be appended to the associated erase unit or stored in the RBO surface area of the hard disk drive. In one embodiment, data storage on the RBO and SMR surfaces are in data block units, and in one embodiment, data blocks in the RBO formatted surface may have a length or size different from data blocks in the SMR formatted surface. Accordingly, storage of data on the SMR surface provides increased data storage density at the expense of organizing the stored data into erase units.

Returning to FIG. 3 and the functionality of the hybrid HDD, a negative response to the determination at step (304) is followed by determining a location in the RBO area of the HDD to store the data (306). Conversely, a positive response to the determination at step (304) is followed by queuing the data for appending to an erase unit in the SMR area of the HDD (308). In one embodiment, the RBO surface of the HDD is used as a storage tier for staging data to be written to the SMR area prior to committing the data to the SMR area. Following either step (306) or (308), the write operation is processed (310). Accordingly, for each write operation, the goal is to append the data to the erase unit associated with the logical block address, and in one embodiment, using the RBO area to queue the data for eventual transfer to the SMR formatted area.

Figure 4:
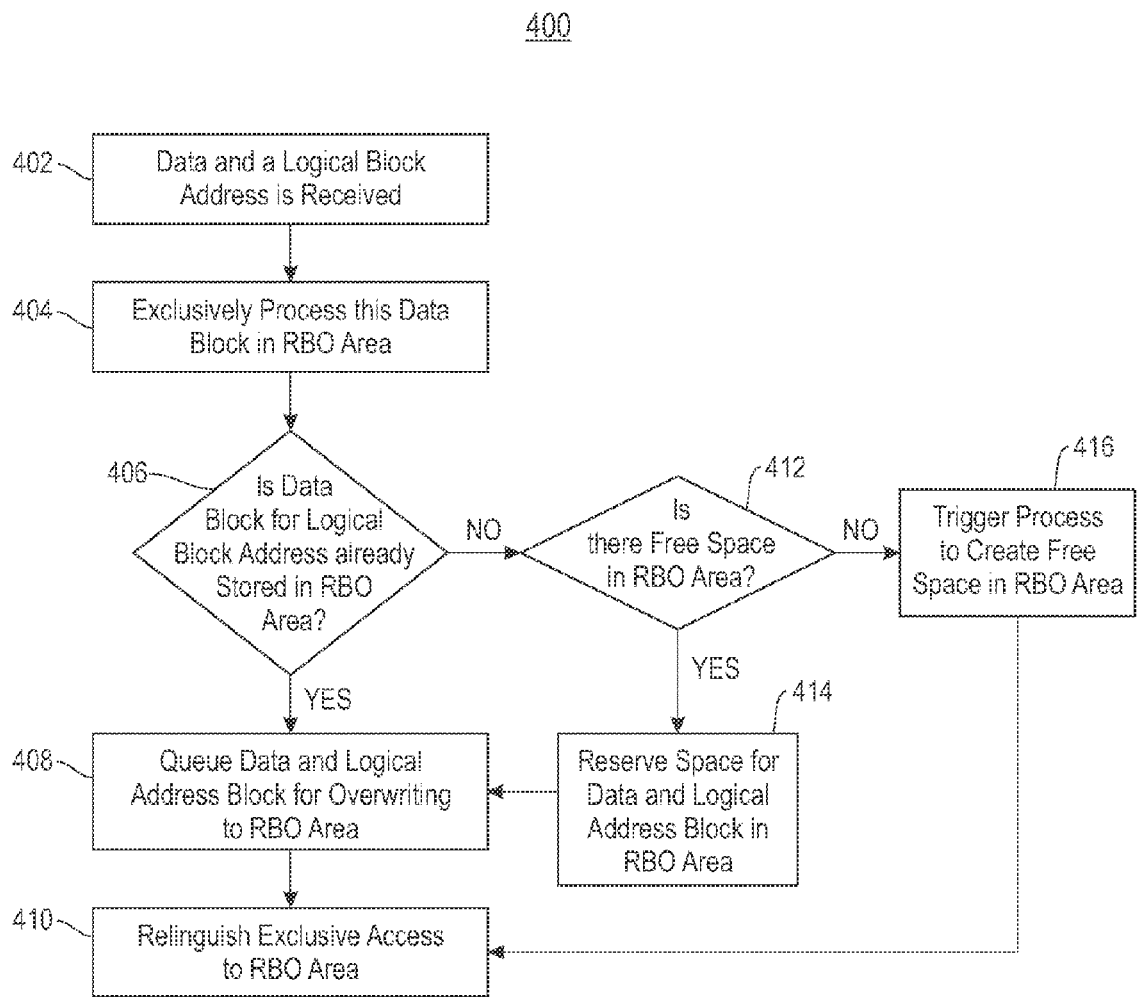
FIG. 4 depicts a flow chart illustrating a process for determining the RBO location in which to store the write data.

As introduced in FIG. 3, the focus in the hybrid HDD is to store the data in the SMR designated area. However, under various circumstances, the data may be stored in the RBO designated area of the HDD. FIG. 4 is a flow chart (400) illustrating a process for determining the RBO location to store the write data. As shown, data and an associated logical block address is received (402). While these data are processed, the RBO index and tables are used and updated exclusively for these data (404). Then, it is determined if an associated data block for the received logical block address is already stored in the RBO designated area (4046). In one embodiment, the determination at step (406) is conducted to ensure that the data in the associated logical block address is already present in the RBO designated area. A positive response to the determination at step (406) is followed by placing the data and associated logical block address in a queue for overwriting the existing data in the RBO designated area of the HDD (408), followed by relinquishing exclusive access to the RBO designated area (410).

If at step (406) it is determined that the data is not already present in the RBO designated area of the HDD, it is then determined if there is free space in the RBO area (412). A positive response to the determination at step (412) is followed by reserving space for the data and the logical block address in the RBO area (414), followed by a return to step (408). However, a negative response to the determination at step (412) is followed by triggering a process for creating free space in the RBO designated area (416), followed by a return to step (410). Details describing the process of creating free space in the RBO designated area are shown and described in FIG. 5. Accordingly, the process shown in FIG. 4 demonstrates storing the data in the RBO designated area of the HDD.

Figure 5:
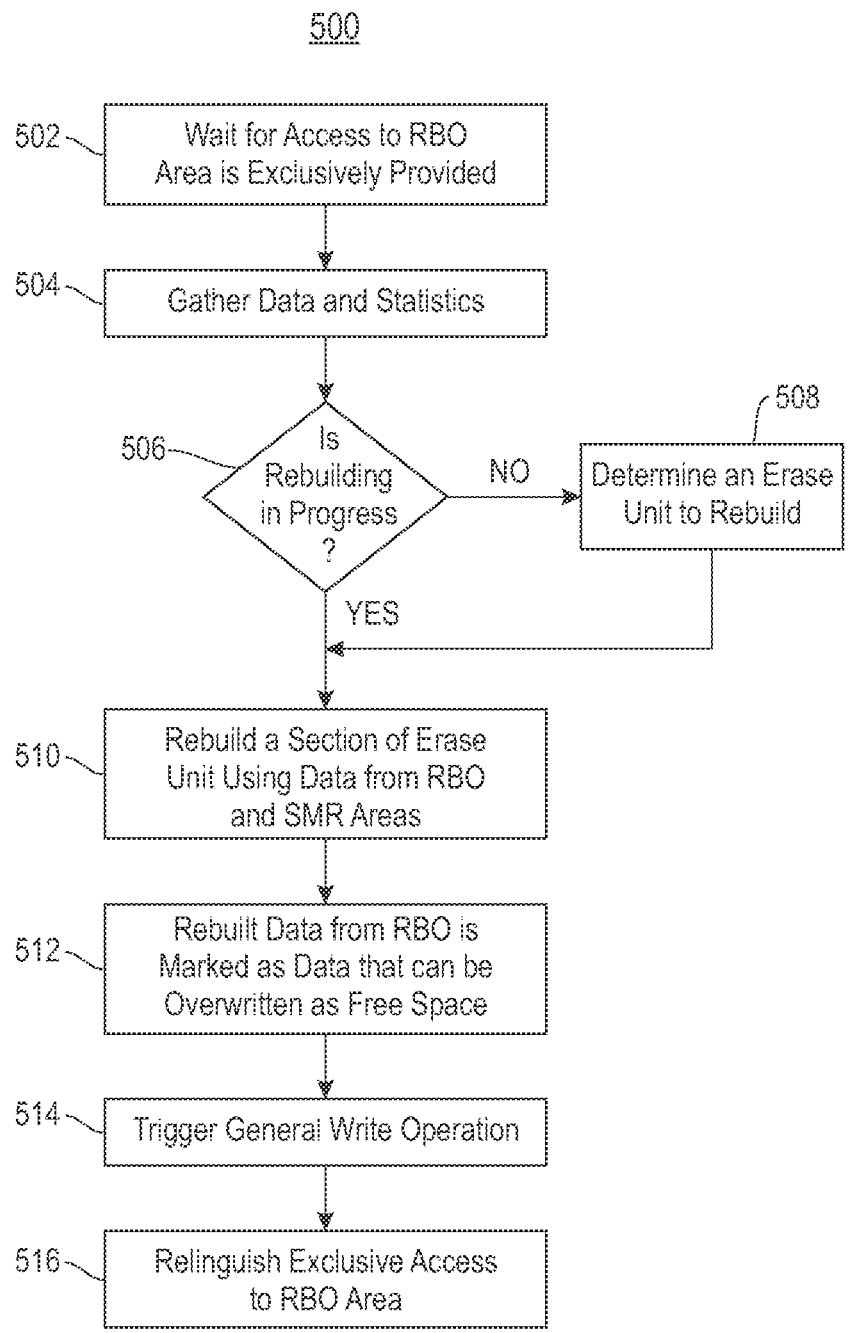
FIG. 5 depicts a flow chart illustrating a process for creating free space in the RBO designated area.

Referring to FIG. 5, a flow chart (500) is provided illustrating a process for creating free space in the RBO designated area of the HDD, also referred to herein as garbage collection. Initially, exclusive access to the RBO designated area is ensured (502), and data and statistics are gathered (504). In one embodiment, the data ascertained at step (504) is exclusive to the RBO designated area, and in one embodiment, includes data for the SMR designated area. Following step (504) it is determined if a rebuilding process is in progress (506). In one embodiment, the rebuilding process includes rewriting data blocks to one or more erase units. A negative response to the determination at step (506) is followed by ascertaining an erase unit to rebuild (508). Following step (508) or a positive response to the determination at step (506), a rebuild of a section of the selected erase unit is conducted using data from both the RBO and SMR areas of the HDD (510). Data from the RBO area that has been rebuilt is marked as data that may be over-written, i.e. free space is created (512). More specifically, at step (512) the rebuilt data is data that has been copied to one or more erase unit, and as such a second copy of the data in the RBO area is unnecessary. The RBO area that stores the replicated data may be over-written with different data. Accordingly, by moving data from the RBO area to one or more erase units, free space in the form of overwritable data in the RBO area is created.

In one embodiment, if the erase unit is to be rebuilt in the same place, a system for preserving data at least one track ahead may be employed. Following step (512), a general write operation may be triggered (514), as shown and described in FIG. 3. Following completion of the garbage collection operation, the exclusive access to the RBO area that was acquired at step (502) is relinquished (516). Accordingly, the process shown herein creates new space in the RBO area by rebuilding one or more erase units with data from the RBO area, and then enabling the replicated data stored in the RBO area to be overwritten to accept new data blocks.

The processes shown in FIGS. 3-5 illustrate aspects of storing data on RBO and SMR formatted surfaces of HDDs. The data storage location, and specifically the surfaces within the HDD, may be dependent upon characteristics inherent within the data, may be depending upon characteristics associated with the write request, and in one embodiment, may be specified in the write request. For example, in one embodiment, a host system associated with the write request may specify a data storage location within the HDD, including designation storage of data in the RBO or SMR formatted surfaces.

Figure 6:
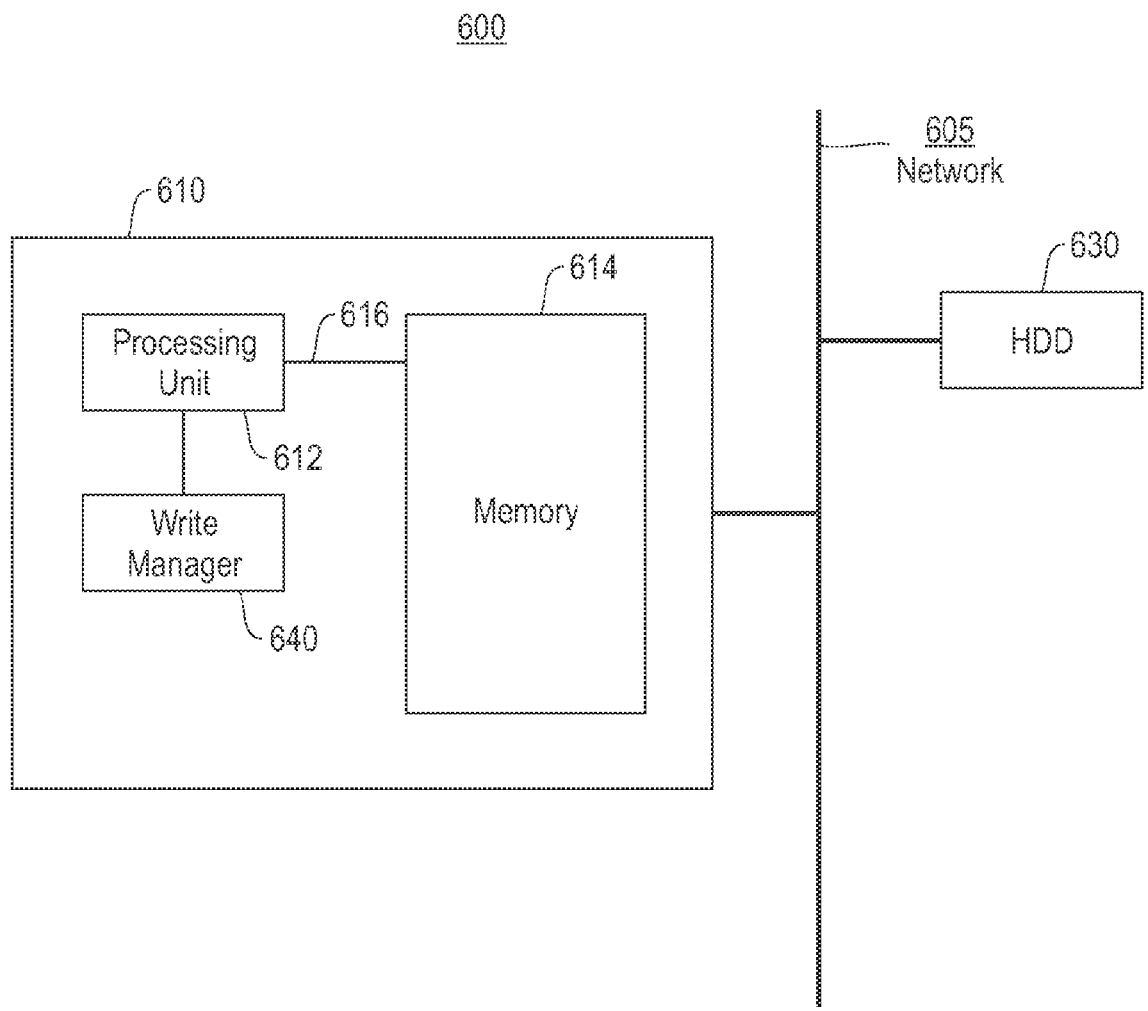
FIG. 6 depicts a block diagram illustrating a host system in communication with the HDD.

Referring to FIG. 6, a block diagram (600) is provided showing a host system (610) in communication with the HDD (630). More specifically, the host system (610) is provided with a processing unit (612) in communication with memory (614) across a bus (616). The HDD (630) may be local to the system, or as shown herein, is provided in communication with the system (610) across a network connection (605). The HDD (630) includes multiple write heads, including at least one RBO formatted write head for writing data to a RBO formatted surface, and at least one SMR formatted write head for writing data to a SMR formatted surface. Details of the write heads and data surfaces are described in FIGS. 1 and 2. In one embodiment, a write manager (640) may be provided in communication with the processing unit (612) to facilitate processing of one or more write requests in response to the write heads and associated surfaces of the HDD (630). Specifically, the manager (640) may employ the RBO surface as a staging area for writing data to the SMR area prior to commitment of the data to the SMR surface. In one embodiment, the manager (640) may write the data to one of the RBO surfaces, locate a free erase unit in the SMR surface, and copy the RBO formatted data to the free erase unit. In one embodiment, the manager (640) may facilitate compression by appending data to a partially free SMR erase unit. As shown in FIG. 2, metadata and an index pertaining to the erase units are maintained in the RBO surface(s). In one embodiment, the manager (640) leverages the metadata and index to efficiently employ and locate the SMR erase units. Accordingly, the manager (640) supports the functionality of the HDD for efficient use thereof.

The manager (640) and any other tools supporting the functionality of the HDD may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 7:
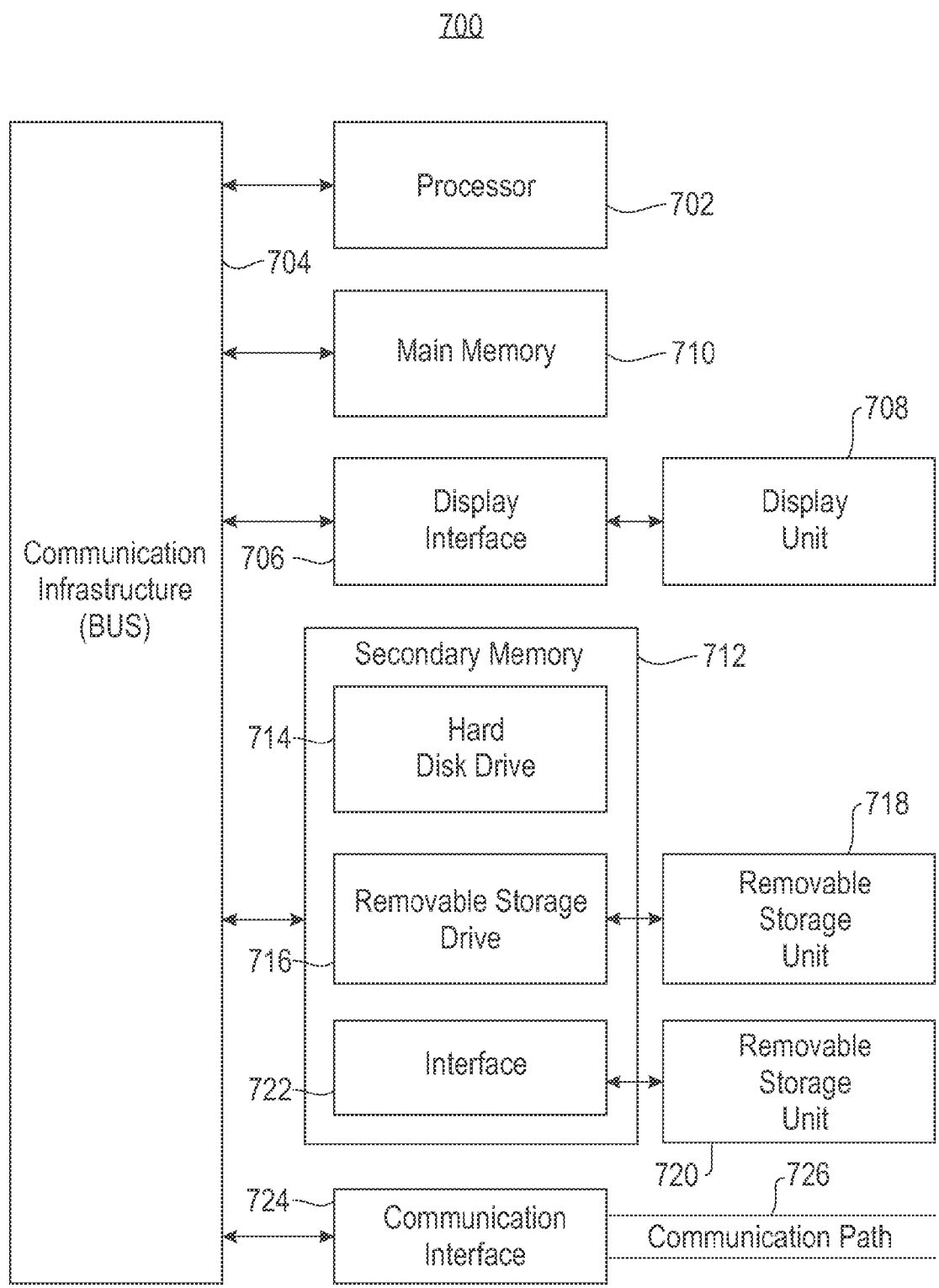
FIG. 7 depicts a block diagram showing a system for implementing an embodiment of the present invention.

Referring now to the block diagram of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by a removable storage drive (716).

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) is in the form of signals which may be, for example, electronic, electromagnetic, optical, or other signals capable of being received by a communications interface (724). These signals are provided to a communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of the HDD combines at least two different formatting techniques in a single storage unit.

Alternative Embodiment

It will be appreciated that, although specific embodiments of the invention have been described herein for purposes of illustration, various modifications may be made without departing from the spirit and scope of the invention. In particular, although a system was described that assigns tiered data to the RBO area, a related technique using log-structured writing can be used whereby no data is written to the RBO. However, the log structure requires indexing and metadata that is efficiently updated in place in the RBO area. Accordingly, the scope of protection of this invention is limited only by the following claims and their equivalents.

I claim:

1. A method comprising:
    formatting a hard disk drive (HDD) with a plurality of data heads and associated data surfaces, including at least one data head optimized for shingled magnetic recording (SMR) to a SMR surface of the HDD, and at least one data head optimized for random block overwrite (RBO) to a RBO surface of the HDD.

2. The method of claim 1, further comprising using the RBO surface of the HDD as a storage tier for staging data to be written to the SMR area prior to committing the data to the SMR area.

3. The method of claim 2, further comprising receiving a write request and performing the write with one of the RBO heads to the RBO optimized surface, including locating a free SMR erase unit and copying the RBO optimized data to the free SMR erase unit.

4. The method of claim 1, further comprising storing SMR metadata in the RBO optimized area of the HDD, the metadata including an index to a location of at least one SMR erase unit and data about at least one partially free SMR erase unit.

5. The method of claim 4, further comprising compressing data in the SMR optimized area, including at least one erase unit having free space, and further comprising appending data to a partially free SMR erase unit, wherein free space in the partially free SMR erase unit is utilized for further data storage.

6. The method of claim 4, wherein the metadata includes layout and ordering of two or more SMR erase units.

7. The method of claim 1, wherein data blocks in the RBO optimized surface have a length different from data blocks in the SMR optimized surface.

8. The method of claim 1, further comprising a host system specifying a data storage location within the HDD, including designating storage in one of the RBO formatted surface and the SMR formatted surface.

9. A computer program product for leveraging surfaces of a hard disk drive (HDD), the computer program product comprising a compute readable storage device having program code embodied therewith, the program code executable by a processing unit to:
    format the hard disk drive (HDD) with a plurality of data heads and associated data surfaces, including at least one data head formatted for shingled magnetic recording (SMR) to a SMR surface of the HDD, and at least one data head formatted for random block overwrite (RBO) to a RBO surface of the HDD; and
    read and write data to the SMR and RBO formatted surfaces, including leveraging random write performance with the RBO formatted surface and storage density with the SMR formatted surface.

10. The computer program product of claim 9, program code to stage data for storage on the SMR formatted surface, including servicing a write request with one of the RBO heads to the RBO formatted surface, locating a free SMR erase unit, and copying the RBO formatted data to the free SMR erase unit.

11. The computer program product of claim 9, further comprising program code to compress data in the SMR formatted surface, including identification of one or more partially free erase units, wherein the partially free erase unit include stored data and free space, and appending data to at least one of the partially free SMR erase units.

12. The computer program product of claim 11, further comprising program code to index a location of at least one SMR erase unit, including storage of SMR metadata in the RBO formatted surface of the HDD.

13. The computer program product of claim 9, wherein the RBO surface includes data about at least one partially free SMR erase unit.

14. The computer program product of claim 9, wherein SMR metadata includes layout and ordering of two or more SMR erase units.

15. The computer program product of claim 9, further comprising program code to specify a data storage location within the HDD, including designating storage in one of the RBO formatted surface and the SMR formatted surface.

16. A computer system comprising:
- a processing unit operatively coupled to memory and a hard disk drive (HDD), the HDD having a dual format;
- the HDD having a plurality of data heads and associated data surfaces, including at least one data head formatted for shingled magnetic recording (SMR) to a SMR surface of the HDD, and at least one data head formatted for random block overwrite (RBO) to a RBO surface of the HDD; and
- a tool in communication with the processing unit, the tool to read and write data to the SMR and RBO formatted surfaces, including leveraging random write performance with the RBO formatted surface and storage density with the SMR formatted surface.

17. The system of claim 16, further comprising the tool to stage data for storage on the SMR formatted surface, including servicing a write request with one of the RBO heads to the RBO formatted surface, locating a free SMR erase unit, and copying the RBO formatted data to the free SMR erase unit.

18. The system of claim 16, further comprising the tool to compress data in the HDD, including identification of one or more partially free erase units, wherein the partially free erase unit includes stored data and free space, and the tool to append data to at least one of the partially free SMR erase units.

19. The system of claim 16, further comprising an index stored in the RBO formatted surface of the HDD, the tool to leverage to storage a location of at least one SMR erase unit in the index, including storage of SMR metadata in the RBO formatted surface of the HDD.

20. The system of claim 16, further comprising the tool to specify a data storage location within the HDD, including designation of data storage in one of the RBO formatted surface and the SMR formatted surface.

* * * * *